United States Patent
Miller

(12) 
(10) Patent No.: US 12,292,930 B1
(45) Date of Patent: May 6, 2025

(54) GRAPH DATABASE INTERFACE SYSTEM

(71) Applicant: NORTHROP GRUMMAN SYSTEMS CORPORATION, Falls Church, VA (US)

(72) Inventor: Michael Shane Miller, Layton, UT (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 18/598,381

(22) Filed: Mar. 7, 2024

(51) Int. Cl.
G06F 16/90 (2019.01)
G06F 16/901 (2019.01)
G06F 16/9038 (2019.01)

(52) U.S. Cl.
CPC ...... G06F 16/9024 (2019.01); G06F 16/9038 (2019.01)

(58) Field of Classification Search
CPC .......................... G06F 16/9024; G06F 16/9038
See application file for complete search history.

(56) References Cited

U.S. PATENT DOCUMENTS

| | | | |
|---|---|---|---|
| 7,800,613 B2* | 9/2010 | Hanrahan | G06F 16/248 345/440 |
| 9,535,963 B1 | 1/2017 | Shankar et al. | |
| 9,916,187 B2 | 3/2018 | Schmid et al. | |
| 10,152,560 B2 | 12/2018 | Potiagalov et al. | |
| 10,783,213 B2 | 9/2020 | Sun et al. | |
| 2013/0321458 A1* | 12/2013 | Miserendino | G06T 11/60 345/629 |
| 2014/0330867 A1 | 11/2014 | Sarkar et al. | |
| 2019/0018904 A1* | 1/2019 | Russell | G06F 16/9024 |
| 2019/0065565 A1* | 2/2019 | Stolte | G06F 16/2282 |
| 2020/0293712 A1* | 9/2020 | Potts | G06F 3/04842 |
| 2023/0060252 A1* | 3/2023 | Bly | G06F 18/285 |
| 2023/0061234 A1* | 3/2023 | Calado | G06F 21/577 |
| 2023/0065398 A1* | 3/2023 | Purdy | H04L 63/1433 |

* cited by examiner

Primary Examiner — Merilyn P Nguyen
(74) Attorney, Agent, or Firm — Tarolli, Sundheim, Covell & Tummino LLP

(57) ABSTRACT

A graph database interface system can facilitate code-free user interaction with a graph database. A graph database including a plurality of nodes connected via a set of relationships can be accessed. The nodes are elements of a dataset of a set of datasets. The relationships have a relationship type of a set of relationship types. The relationships between nodes of a given dataset and an additional dataset have a given relationship type associated with the given dataset and the additional dataset. A graphical interface can be generated to visually represent the sets of datasets and relationship types. A user input can be received via the graphical interface indicating a first dataset. A query of the graph database can be generated based on the user input. A response to the query can be received. The response can be displayed as a table via the graphical interface.

20 Claims, 12 Drawing Sheets

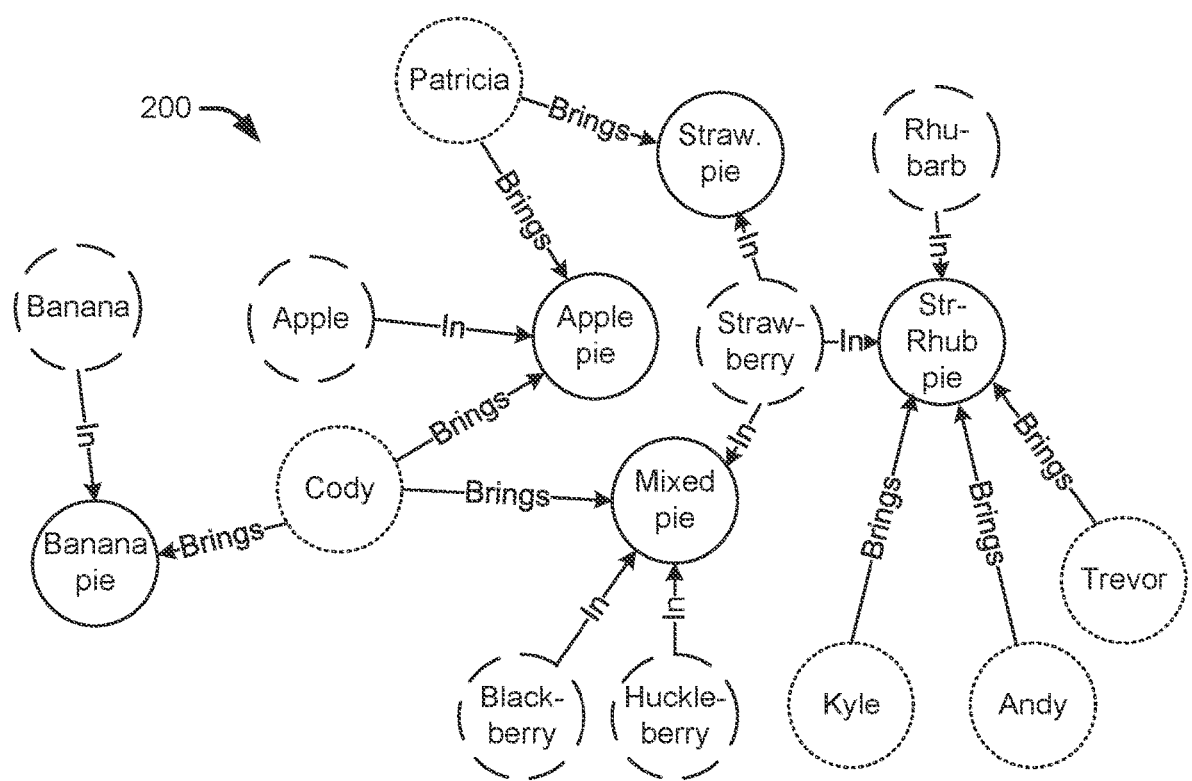
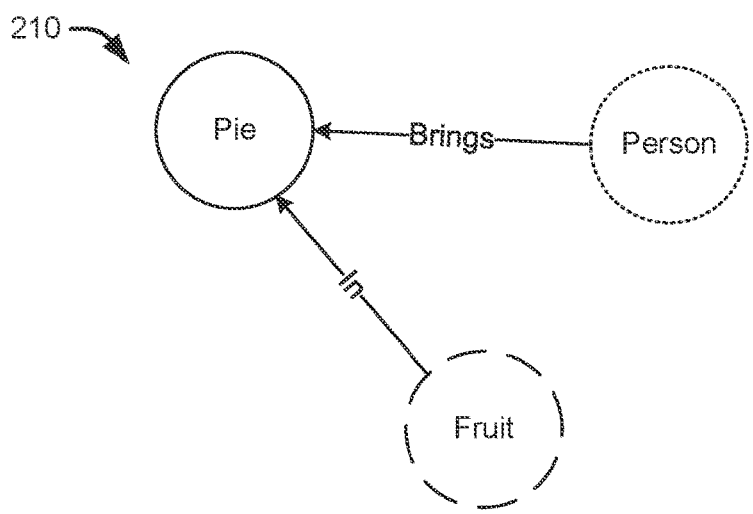
FIG. 2

| Product | |
|---|---|
| name ↑ | status |
| API | development |
| Data analyzer | development |
| Development tool | released |
| Game | research |
| Language model | test |
| Movie | released |
| Scheduler | development |
| UI | research |
| Virtual reality | released |
| Word processor | released |

620

Connections for Product
- owned by — Organization ∨ SHOW ALL
- has stakeholder — Person ∨ SHOW ALL
- developed by — Site ∨ SHOW ALL

610

Data Map

| Product | | (developed by) Site | |
|---|---|---|---|
| name ↑ | status | name ↑ | |
| API | development | Blue Site | |
| | | Red Site | |
| | | Site 2 | |
| | | Site A | |
| Data analyzer | development | Blue Site | |
| | | Red Site | |
| | | Site 1 | |
| | | Site A | |
| Development tool | released | N/A | |
| Game | research | Blue Site | |
| | | Red Site | |
| | | Site 2 | |
| | | Site A | |
| | | Site B | |
| Language model | test | N/A | |
| Movie | released | N/A | |
| Scheduler | development | N/A | |

720

Connections for Site

(provides) Capability
∨ SHOW ALL (supports) Organization
∨ SHOW ALL (managed by) Person
∨ SHOW ALL (develops) Product
∨ SHOW ALL

710

Data Map

| Person | stakeholder for Product | has stakeholder Person |
|---|---|---|
| name ↑ | name ↑ | name ↑ |
| Abraham | Data analyzer | Abraham |
| | | Allan |
| | | Alsop |
| | | Anderson |
| | | Arnold |
| | | Bailey |
| Allan | Data analyzer | Abraham |
| | | Allan |
| | | Alsop |
| | | Anderson |
| | | Arnold |
| | | Bailey |
| ... | ... | ... |

Connections for Person
- belongs to — Organization ⌄ SHOW ALL
- managed by — Person ⌄ SHOW ALL
- manages — Person ⌄ SHOW ALL
- stakeholder for — Product ⌄ SHOW ALL
- manages — Site ⌄ SHOW ALL  ← 910

Data Map  ← 900

| Person | | (manages) Person | |
|---|---|---|---|
| name ↑ | ⊕ | name ↑ | ⊕ |
| Abraham | | Clarkson | |
| Allan | | N/A | |
| Alsop | | Davies | |
| | | Dyer | |
| | | Edmunds | |
| | | Ellison | |
| | | Fisher | |
| | | Forsyth | |
| Anderson | | N/A | |
| Arnold | | N/A | |
| Avery | | N/A | |
| Bailey | | N/A | |
| Baker | | N/A | |
| Ball | | N/A | |

Connections for Person (belongs to) Organization ∨ SHOW ALL (managed by) Person ∨ SHOW ALL (manages) Person ∨ SHOW ALL (stakeholder for) Product ∨ SHOW ALL (manages) Site ∨ SHOW ALL

← 1010

Data Map

GRAPH DATABASE INTERFACE SYSTEM

TECHNICAL FIELD

This description relates to a graph database interface system for generating queries of graph databases through a graphical user interface.

BACKGROUND

A graph database is a database that uses the structure of a graph from graph theory (wherein vertices or nodes are connected by edges or relationships that can be directed or undirected) to represent and store data. Data items stored in a graph database are represented by nodes or vertices, and the relationship(s) between data items is represented by relationships or edges. Graph databases have low overhead and are scalable, allowing them to be employed in connection with large, highly connected datasets.

SUMMARY

A first example relates to a non-transitory machine-readable medium having machine executable instructions for a graph database interface that cause a processor core to execute operations. The operations include accessing a graph database including a plurality of nodes connected via a set of relationships. Nodes of the plurality of nodes are elements of a dataset of a set of datasets. Relationships of the set of relationships have a relationship type of a set of relationship types. The relationships between nodes of a given dataset and an additional dataset have a given relationship type of the set of relationship types. The given relationship type is associated with the given dataset and the additional dataset. The operations also include generating a graphical interface that visually represents the set of datasets along with the set of relationship types. The operations additionally include receiving a user input via the graphical interface indicating a first dataset of the set of datasets. The operations further include generating a query of the graph database based on the user input. The operations additionally include receiving a response to the query. The operations also include displaying the response as a table via the graphical interface.

A second example relates to a graph database interface system that includes a memory for storing machine-readable instructions and a processor core for accessing the machine-readable instructions and executing the machine-readable instructions as operations. The operations include accessing a graph database including a plurality of nodes connected via a set of relationships. Nodes of the plurality of nodes are elements of a dataset of a set of datasets. Relationships of the set of relationships have a relationship type of a set of relationship types. The relationships between nodes of a given dataset and an additional dataset have a given relationship type of the set of relationship types. The given relationship type is associated with the given dataset and the additional dataset. The operations also include generating a graphical interface that visually represents the set of datasets along with the set of relationship types. The operations additionally include receiving a set of user selections via the graphical interface indicating a first dataset of the set of datasets. The operations further include generating a query of the graph database based on the set of user selections. The operations additionally include receiving a response to the query. The operations also include displaying the response as a table via the graphical interface.

A third example relates to a method for interacting with a graph database. The method includes accessing a graph database including a plurality of nodes connected via a set of relationships. Nodes of the plurality of nodes are elements of a dataset of a set of datasets. Relationships of the set of relationships have a relationship type of a set of relationship types. The relationships between nodes of a given dataset and an additional dataset have a given relationship type of the set of relationship types. The given relationship type is associated with the given dataset and the additional dataset. The method also includes generating a graphical interface that visually represents the set of datasets along with the set of relationship types. The method additionally includes receiving a user input via the graphical interface indicating a first dataset of the set of datasets. The method further includes generating a query of the graph database based on the user input. The method additionally includes receiving a response to the query. The method also includes displaying the response as a table via the graphical interface.

BRIEF DESCRIPTION OF THE DRAWINGS

FIG. 2 illustrates an example of a graph and a metagraph associated with the graph.

FIG. 6 illustrates the example GUI of the graph database interface system of FIG. 5 with a dataset selected.

FIG. 7 illustrates the example GUI of the graph database interface system of FIGS. 5-6 with a traversal across two datasets.

FIG. 8 illustrates the example GUI of the graph database interface system of FIGS. 5-7 with a traversal across four datasets.

FIG. 9 illustrates the example GUI of the graph database interface system of FIGS. 5-8 with a non-simple traversal.

FIG. 10 illustrates the example GUI of the graph database interface system of FIGS. 5-8 with a traversal of a self-referential relationship type.

DETAILED DESCRIPTION

Graph databases are a useful tool for storing the relationships between nodes (the various data items stored in the graph database) that can be employed in connection with large, highly connected datasets. Graph databases have applications in a variety of fields, such as maintenance data analytics, facility management, deployment order computation, knowledge graphs, digital twins, supply chains, data loss prevention, social media, fraud detection, drug interactions, and many other use cases. However, accessing useful information stored in a graph database is challenging. In conventional systems, developers interact with graph databases through queriers in languages like Cypher or GraphQL. Many end users, analysts, and administrators are not familiar with these specialized languages. Additionally, these queries return hierarchical data in formats such as JSON (JavaScript Object Notation) or XML (Extensible Markup Language). Additional scripts and interfaces are needed to convert hierarchical data into more easily digested tables. While custom software can be developed for individual graph databases to explore, view, and export data, conventional systems and methods do not allow users to view tabular information associated with an arbitrary graph database based on code-free inputs.

The systems and methods described herein provide a no-code graph database interface system that addresses the challenges of querying graph databases. Queries are constructed visually, so users do not need to learn new graph query languages. Results are returned as tables, which are easily useable by end users or additional down-stream applications. Systems and methods discussed herein allow interaction with an arbitrary graph database, eliminating the need for use-case specific development. These systems and methods allow end users to generate sophisticated queries of graph databases without writing code (e.g., a structured query in a database query language).

Systems and methods described herein function for an arbitrary graph database and return requested data to a user as a table (or exporting data in any of a variety of formats, such as a comma-separated values (CSV) file, etc.). This avoids the need to develop a custom solution for each graph database use case, to employ specialized graph database developers, to train end users such as analysts and administrators in graph query languages to interface with graph databases, or to redo work when data in a graph database is not able to be viewed or explored early in a project lifecycle. Instead, systems and methods described herein allow end users to interact visually with graph databases to construct queries, while returning responses to those queries in a tabular form that provide important details that would be lost with graphical output. Thus, systems and methods discussed herein reduce costs and improve a user interface for working with information stored in graph databases, which results in increased efficiency.

Figure 1:
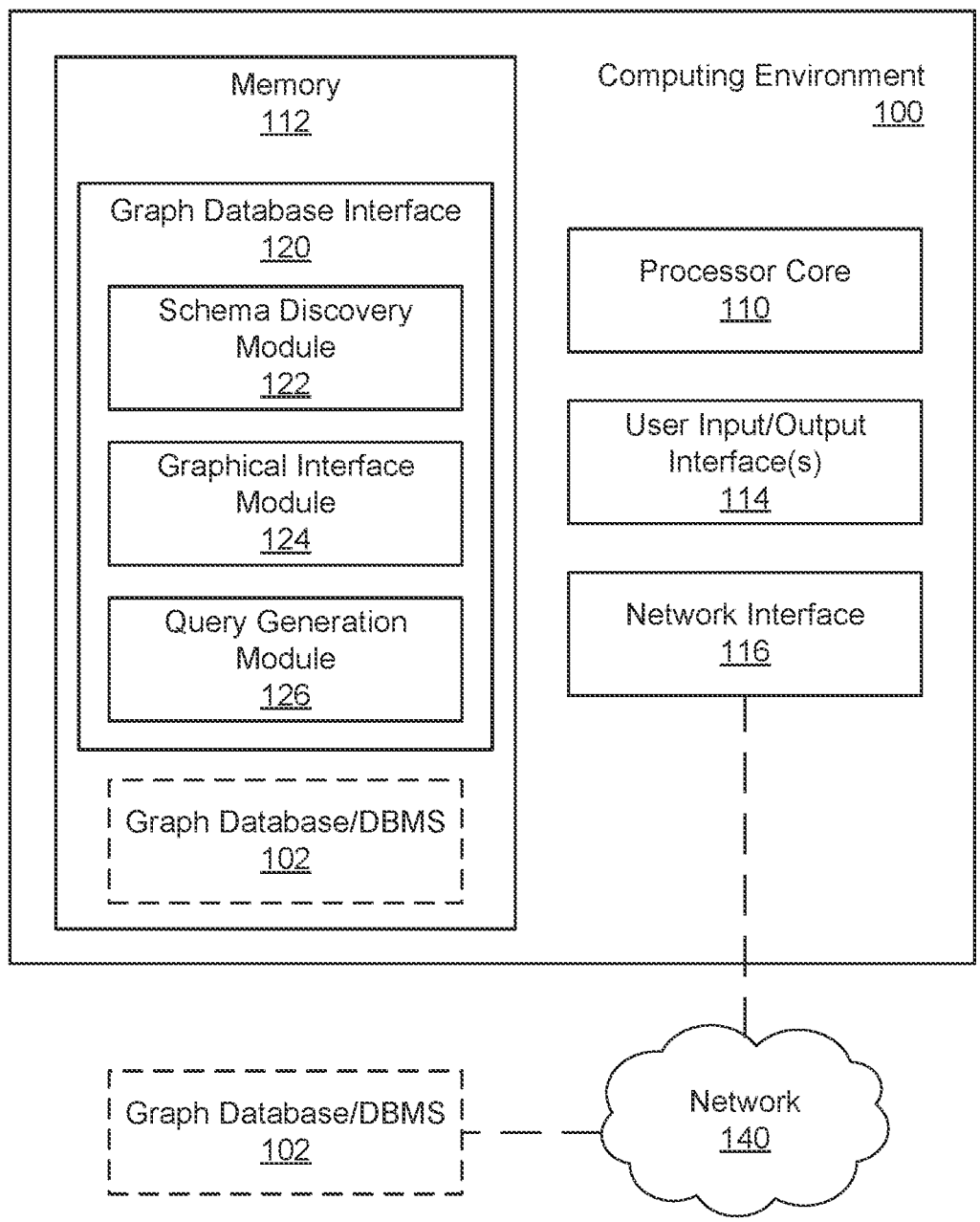
FIG. 1 illustrates an example of an operating environment for a graph database interface system.

FIG. 1 illustrates an example operating environment of a computing environment 100 implementing a graph database interface system capable of generating tabular responses to queries to a graph database 102 (accessed via a database management system (DBMS)) that are generated via a graphical user interface (GUI).

The computing environment 100 includes a processor core 110, a memory 112, a user input/output (I/O) interface 114, and a network interface 116, which are operably connected for computer communication. The processor core 110 performs general computing to execute instructions stored in the memory 112, including instructions associated with a graph database interface 120. The instructions cause the processor core 110 to execute operations. The memory 112 also stores instructions associated with an operating system that controls and/or allocates resources of the computing environment 100, including resources associated with the graph database interface 120. In some scenarios, the memory 112 stores the graph database 102 locally, while in other scenarios the graph database 102 is stored remotely, and in further scenarios the graph database 102 is stored partially locally and partially remotely. The memory 112 represents a non-transitory machine-readable memory (or other medium), such as random-access memory (RAM), a solid state drive, a hard disk drive or a combination thereof.

The graph database interface 120 includes a schema discovery module 122, a graphical interface module 124, and a query generation module 126. The memory 112 stores machine-readable instructions associated with the modules 122-126.

The processor core 110 accesses the memory 112 and executes the machine-readable instructions as operations. The processor core 110 can be a variety of various processors including multiple single- and multi-core processors, co-processors, and other multiple single and multicore processor and co-processor architectures.

The user I/O interface 114 provides software and hardware to facilitate data input and output between the computing environment 100 and a user. This can include input devices such as a keyboard, mouse, touchpad, touchscreen, microphone, etc., as well as output devices such as display(s) (e.g., light-emitting diode (LED) display panel(s), liquid crystal display (LCD) panel(s), plasma display panel(s), and/or touch screen display(s), etc.), speaker(s), etc. The user I/O interface 114 provides graphical input controls for a user interface, which can include software and hardware-based controls, interfaces, touch screens, or touch pads or plug and play devices for a user to provide user input.

The network interface 114 provides software and hardware to facilitate data input and output between the computing environment 100 and graph database 102 via a network 140. The network 140 is, for example, a data network, the Internet, a wide area network (WAN) or a local area (LAN) network. The network 140 serves as a communication medium to various remote devices (e.g., databases, web servers, remote servers, application servers, intermediary servers, client machines, other portable devices).

The memory 112 includes the graph database interface 120 that includes modules 122-126 that operate in concert and/or stages to facilitate user interaction with graph database 102 (e.g., generation of queries and displaying of query responses in tabular form, etc.).

The schema discovery module 122 performs schema discovery of the graph database 102 by analyzing the graph database 102 to determine what nodes are in the graph database 102, what properties those nodes have, what datasets those nodes belong to (each discovered dataset includes all analyzed nodes that have a common label or type, such as all persons or all sites, etc.), and what types of relationships exist between those nodes. Based on the discovered schema, the schema discovery module 122 constructs a metagraph for the graph database that characterizes the datasets of the graph database, connecting the datasets to each other by the relationship types that have been determined between the datasets. In some examples, user constraints are received that specify one or more of: nodes for which a schema is to be constructed, relationships for which a schema is to be constructed, or properties of nodes for which a schema is to be constructed. When user constraints are received, the schema discovery module 122 performs schema discovery on the graph database 102 based on the user constraints. In other examples, no user constraints are defined. When no user constraints are received, the schema discovery module 122 performs schema discovery on the entire graph database 102.

The graphical interface module 124 provides a GUI that displays information associated with the graph database 102 (e.g., datasets, properties, relationship types, etc.) in one or more formats (e.g., metagraph, list, etc.). The GUI receives user inputs (e.g., selections of datasets, relationship types, properties, etc.) that are used (by query generation module 126) to generate queries of the graph database 102 through the DBMS. Responsive to query generation module 126 receiving a query response from the DBMS, the graphical interface module 124 presents the query response as a table for the user to view or interact with (e.g., to further refine the query, generate another query, etc.).

The query generation module 126 generates structured graph database queries in an appropriate language for the DBMS based on user inputs and receives responses to those queries from the DBMS. These user inputs can include selection of datasets or subsets thereof, traversal(s) of the graph database, aggregation of a property of a dataset onto nodes of another dataset, sorting, filtering, etc.

FIG. 2 illustrates an example of a graph 200 (e.g., the graph of the graph database 102 of FIG. 1, etc.) and a metagraph 210 (e.g., generated by the graph database interface 120 of FIG. 1, etc.) associated with the graph 200. As used herein, "metagraph" refers to a graph containing a node for each type (also referred to as label) of node contained in the original database. Two metagraph nodes are connected by a relationship type when any one node of the first type is related to any one node of the second type in the database. The example graph 200 shows five different persons (Andy, Cody, Kyle, Patricia, and Trevor), five different types of pie (apple pie, banana pie, mixed berry pie, strawberry pie, and strawberry rhubarb pie), six different types of fruit (apple, banana, blackberry, huckleberry, rhubarb, and strawberry), and relationships between the persons, types of pie, and types of fruit. Each node sharing a common type or label (e.g., person, pie, or fruit) belongs to the same dataset (e.g., the person dataset, the pies dataset, or the fruit dataset, respectively). For purposes of simplification of explanation, the metagraph 210 has a single node for each different dataset, but in other examples, there could be multiple nodes for each different dataset or some subset thereof.

As long as at least one node of a first dataset has a relationship to a node of a second dataset, there is a relationship type between those datasets in the metagraph. In the metagraph 210, relationships are shown between person and pie, and between pie and fruit, but not between person and fruit, as the graph 200 does not have any relationships between a person and a fruit.

The relationships between nodes and the relationship types of those relationships can be undirected (where the relationship between the two nodes is independent of the direction the relationship or edge is crossed) or directed (where the relationship between the two nodes depends on the direction the relationship or edge is crossed). In the graph 200, each of the relationships is directed. For example, the relationship between Cody and banana pie in the graph 200 is "Cody brings banana pie" if crossed from Cody to banana pie, as opposed to "banana pie is brought by Cody" if crossed from banana pie to Cody. "X is a sibling of Y" is an example of an undirected relationship. The metagraph 210 shows the relationships between person(s) and pie(s) and between pie(s) and fruit(s) indicated in graph 200, depending on the direction of traversal shown in graph 200. A "traversal" as used herein refers to a path through a graph database from a first subset of a first dataset to a second subset of a second dataset, crossing at least one relationship. A traversal may visit nodes more than once and may traverse relationships in either direction. Traversals are directional. The first node of a traversal is referred to as a root of the traversal. Between two adjacent nodes in a traversal, one node will be referred to as the parent, and the other as the child, based on the traversal direction (e.g., from the parent across the relationship to the child). Queries of graph databases (other than some queries regarding a single dataset) generally involve traversals of the graph database.

Figure 3:
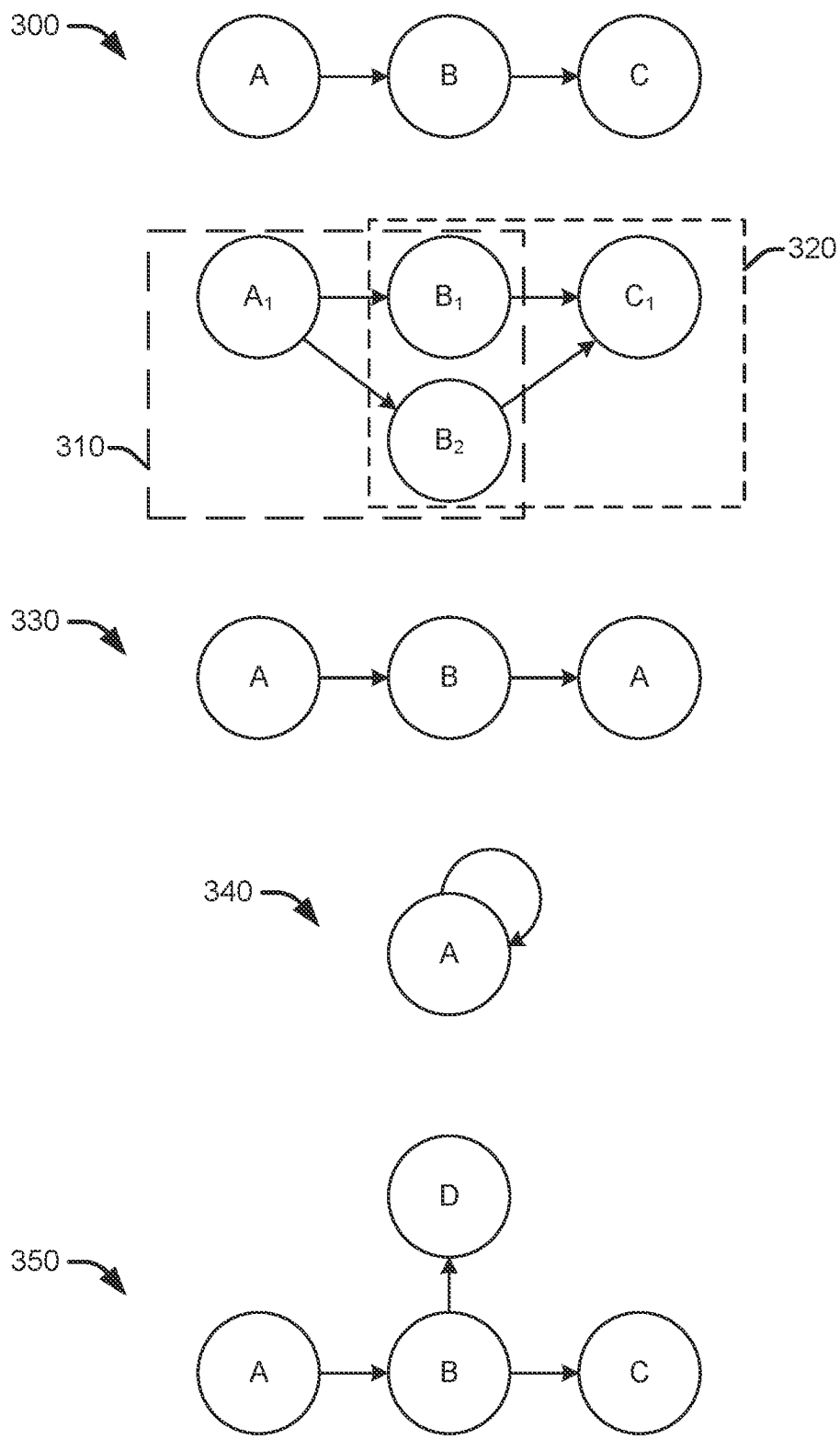
FIG. 3 illustrates different types of traversals of datasets or subsets thereof of a graph database.

FIG. 3 illustrates different types of traversals (e.g., generated as queries via the graph database interface 120 of FIG. 1 based on a set of user inputs from a user, etc.) of datasets or subsets thereof of a graph database (e.g., graph database 102 of FIG. 1, etc.).

At 300 is a simple traversal from a dataset A, across relationship(s) between dataset A and dataset B to dataset B, and across relationship(s) between dataset B and dataset C to dataset C.

The traversal 310 shows a one-to-many relationship in a traversal from a node $A_1$ of a dataset A to nodes $B_1$ and $B_2$ (e.g., two different nodes of a dataset B), across the relationships from node $A_1$ to node $B_1$ and from node $A_1$ to node $B_2$ (e.g., such as in FIG. 2, for a query involving which pies Patricia brings: apple pie and strawberry pie).

The traversal 320 shows a many-to-one relationship in a traversal from nodes $B_1$ and $B_2$ to a node $C_1$ of a dataset C, across the relationships from node $B_1$ to node C and from node $B_2$ to node C (e.g., such as in FIG. 2, for a query involving persons who bring strawberry-rhubarb pie: Kyle, Andy, and Trevor).

The traversal 330 is a non-simple traversal involving traversing a relationship more than once, from dataset A across relationship(s) between dataset A and dataset B to dataset B, and then across the relationship(s) between dataset B and dataset A (in the opposite direction) to dataset A (e.g., such as in FIG. 2, for a query involving persons who bring a type of pie that Kyle brings: Kyle brings strawberry-rhubarb pie, which is brought by Kyle, Andy, and Trevor).

The traversal 340 is a traversal of a self-referential relationship, for a dataset A that has node(s) with relationship(s) to other node(s) in dataset A. An example of this type of traversal would be a query of persons managed by or managing other persons in an organizational chart.

The traversal 350 involves a non-linear traversal from a dataset A to a dataset B across the relationship(s) between dataset A and dataset B, from dataset B to dataset C across the relationship(s) between dataset B and dataset C, and from dataset B to dataset D across the relationship(s) between dataset B and dataset D, for situations in which datasets C and D are not the same dataset. Systems and methods discussed herein are capable of aggregating one or more properties of dataset C and/or dataset D onto dataset B in connection with queries involving this type of traversal.

Figure 4:
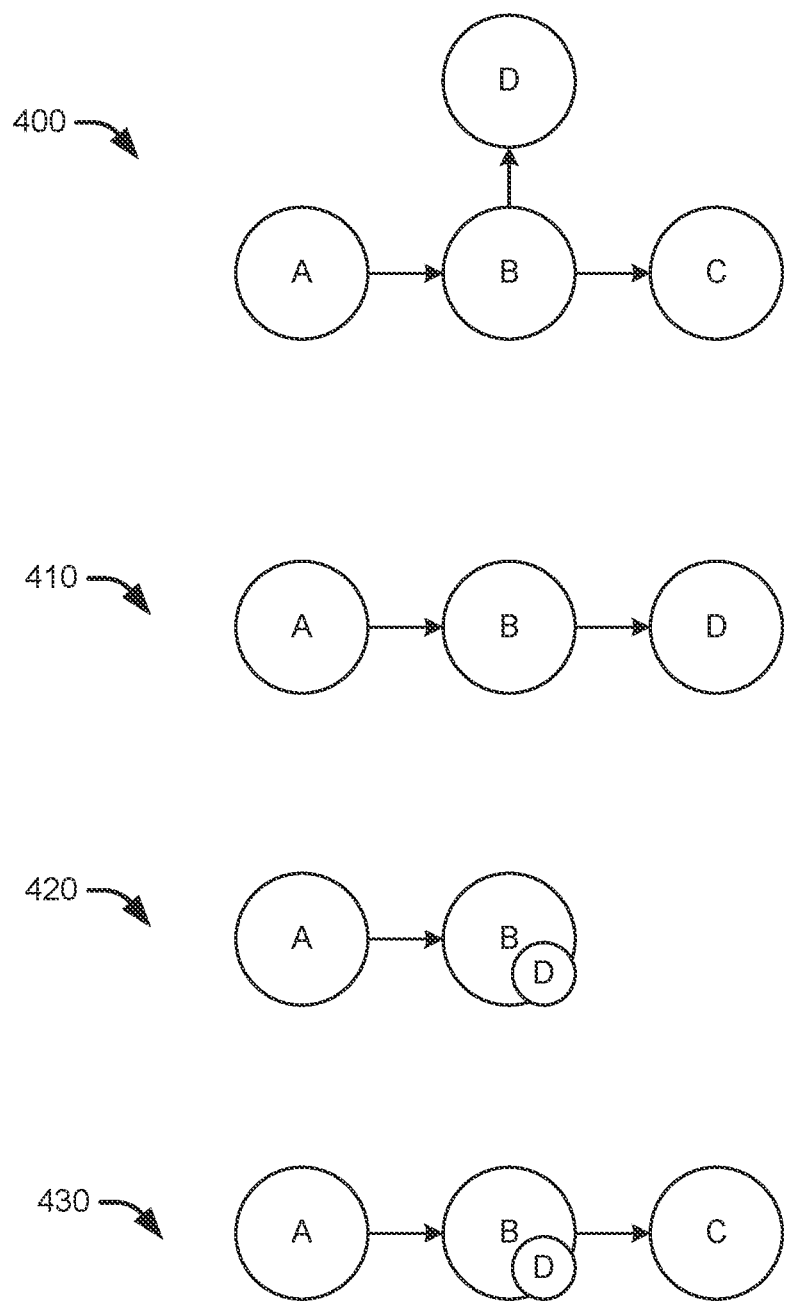
FIG. 4 illustrates an example of aggregation of properties of a child dataset onto a parent dataset in connection with a non-linear traversal of a metagraph.

FIG. 4 illustrates an example of aggregation of properties of a child dataset onto a parent dataset (e.g., of a graph database 102 of FIG. 1, etc.) in connection with a non-linear traversal of a metagraph (e.g., generated as a query via the graph database interface 120 based on a set of user inputs from a user, etc.).

At 400 is shown the same traversal as in FIG. 3 at 350, from a dataset A to a dataset B across the relationship(s) between dataset A and dataset B, from dataset B to dataset C across the relationship(s) between dataset B and dataset C, and from dataset B to dataset D across the relationship(s) between dataset B and dataset D. In the example aggregation of FIG. 4, one or more properties of dataset D (e.g., a count of how many nodes are in subset D, a list of nodes, a first node (e.g., alphabetically, if applicable), a last node (e.g., alphabetically, if applicable), a minimum value (if applicable), a maximum value (if applicable), a sum of values (if applicable), etc.) will be aggregated and treated as a property of nodes of dataset B. For example, in FIG. 2, dataset A could be persons, dataset B could be pies, dataset C could be fruit, and dataset D could be persons again. An example query could relate to determining, for each person (dataset A), what pies are they bringing (dataset B), the number of people that pie is brought by (a property of dataset D), and what fruit(s) are in those pies (dataset C).

At 410, a first linear portion of the traversal of 400 is shown, showing a traversal from dataset A through dataset B to dataset D. Continuing the example from 400, this traversal would be from persons to the pies they bring to the persons those pies are brought by. A portion of the result of such a query would be that Cody brings apple pie (brought by Cody and Patricia), banana pie (brought only by Cody), and mixed berry pie (brought only by Cody).

At 420, a traversal is shown from dataset A to dataset B, where a property of dataset D is shown aggregated as a property of dataset B. Continuing the example, this traversal would be from persons to the pies they bring along with how many people those pies are brought by. A portion of the result of such a query would be that Cody brings apple pie (brought by 2 persons), banana pie (brought by 1 person), and mixed berry pie (brought by 1 person).

At 430, a traversal is shown from dataset A to dataset B (where a property of dataset D is shown aggregated as a property of dataset B) to dataset C. Continuing the example, this traversal would be from persons to the pies they bring (along with how many people those pies are brought by) to the fruit(s) those pies contain. A portion of the result of such a query would be that Cody brings apple pie (brought by 2 persons), which contains apple; banana pie (brought by 1 person), which contains banana; and mixed berry pie (brought by 1 person), which contains blackberry, huckleberry, and strawberry.

FIGS. 5-10 illustrate different views of an example GUI (e.g., generated by the graphical interface module 124 of FIG. 1, etc.) of a graph database interface system (e.g., the graph database interface 120, etc.). FIGS. 5-8 show the example GUI in connection with a first example graph database involving five datasets (site, person, capability, organization, and product) and having a first metagraph (with no self-referential relationships). FIGS. 9 and 10 show the example GUI in connection with a second example graph database involving the same five datasets and having a second metagraph (with self-referential relationships from the person dataset to the person dataset).

Figure 5:
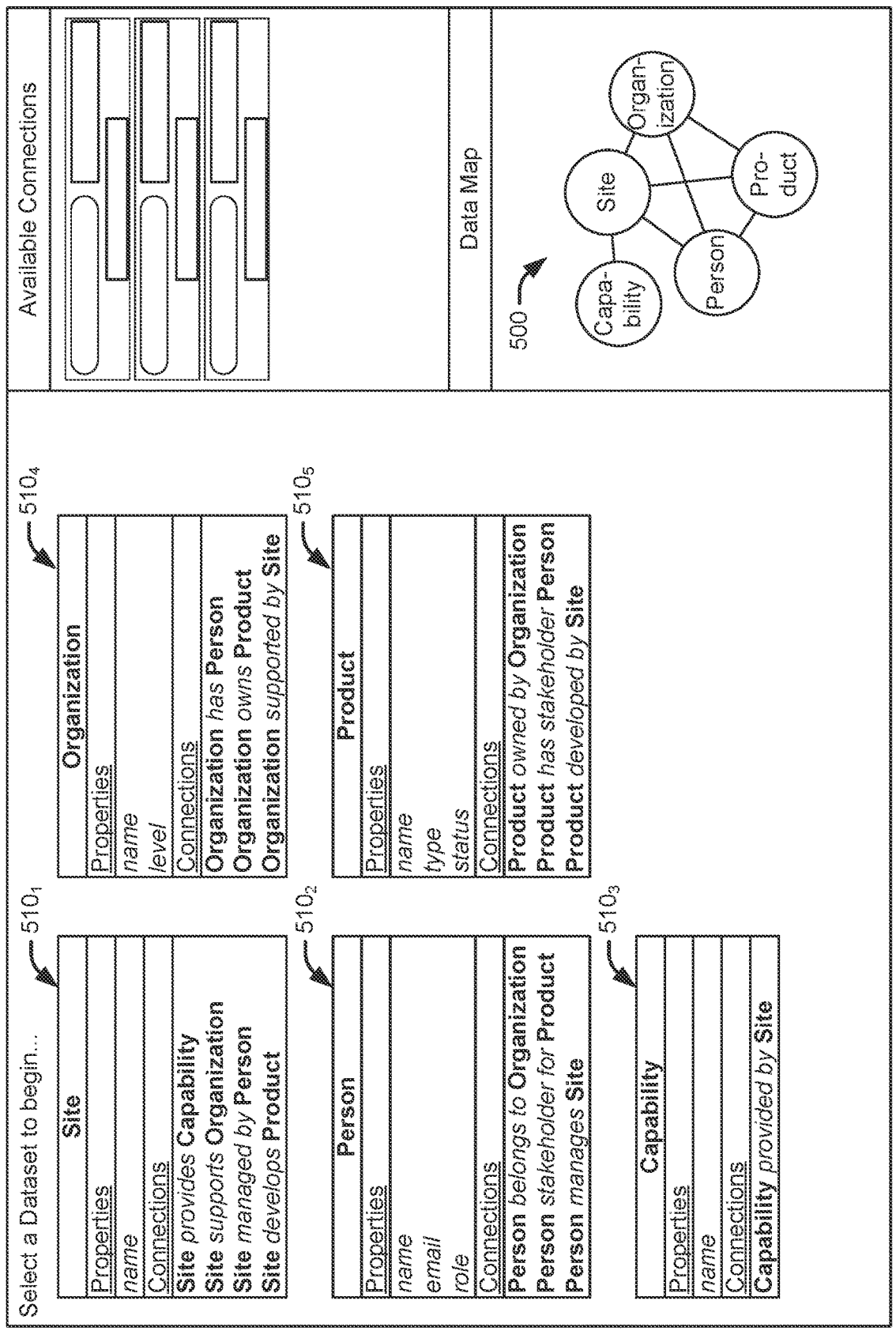
FIG. 5 illustrates a view of an example graphical user interface (GUI) of a graph database interface system for generating queries of a graph database, showing information associated with the graph database.

Referring to FIG. 5, illustrated is a view of an example GUI of a graph database interface system for generating queries of a graph database, showing information associated with the graph database. FIG. 5 shows a metagraph 500 of the example graph database, showing the datasets connected to each other by relationship types (the lines connecting the datasets in the metagraph 500). These connections are shown in the metagraph 500 as long as at least one relationship exists between nodes of the two datasets. Additionally, the datasets are shown in a list of cards 510$i$, each of which shows the name of the dataset, property types at least one nodes of the dataset has, and connections (via relationships) that dataset has to the same or other datasets. In some examples, the GUI presents the datasets as visually distinct from each other, for example by having a different color for each, which is used in the list of datasets (e.g., the cards 510$_1$-510$_5$) and/or in the metagraph 500. An end user begins generating a query by selecting a dataset via either the metagraph 500 or the list of cards 510$_i$. FIG. 5 also has a region (upper right) to show available connections (since no dataset has been selected in FIG. 5, no connections are shown).

FIG. 6 shows the example GUI of the graph database interface system of FIG. 5 with a dataset selected. Continuing from the example of FIG. 5, the product dataset has been selected. Based on this selection, a query was generated and the graph database was queried for all nodes of the product dataset and user-selected (e.g., among any properties present in the schema) properties (name and status) of nodes of the product dataset. A portion of the result of this query is shown as a table at 620.

The metagraph 600 has the same datasets and relationship types as the metagraph 500, but the product dataset and connections associated with the product dataset are emphasized to reflect the user selection of the product dataset. Additionally, 610 shows the connections available for the product dataset selected by the user, as well as the relationship types of those connections (e.g., owned by organization, has stakeholder person, developed by site). If desired by a user, a second dataset is selectable through either the metagraph 600 or the listed connections 610 to generate a query based on a traversal from product to the second dataset.

Additionally, users can provide user input to interact with the table 620 in a variety of ways. The table 620 can be sorted based on any of the user-selected properties (name and status), as indicated by the arrow adjacent to "name," showing the current sorting selection. The table 620 can be filtered by clicking on the filtering icon (three vertically arranged horizontal lines where each line is shorter than the one above it) at the top right of the table 620 (followed by selection of how to filter the table 620). Additionally, the product dataset can be unselected with the "X" at the top right of the table 620, to allow generation of a different query. Shown at the far right of the table 620 in the row of properties (name and status) is a plus sign in a circle (⊕), allowing for additional properties to be shown in the table 620, such as properties aggregated from another dataset and represented as properties of the product dataset, allowing for traversals that branch to multiple child datasets. In scenarios wherein aggregated properties from another (e.g., child) dataset (e.g., number of sites a product is or was developed by) are shown in a table of the example GUI as properties of a listed dataset, a user is able to sort based on those aggregated properties and/or can remove those aggregated properties similarly to how the product dataset can be unselected.

Referring to FIG. 7, illustrated is the example GUI of the graph database interface system of FIGS. 5-6 with a traversal from the product dataset to the site dataset selected. Continuing from the example of FIGS. 5-6, the site dataset was selected. Based on this selection, a query was generated and the graph database was queried for all products and the site(s) those products are or were developed by. A portion of the result of this query is shown as a table at 720.

The metagraph 700 has the same datasets and relationship types as the metagraphs 500 and 600, but the site dataset and connections associated with the site dataset are emphasized to reflect the most recent user selection of the site dataset. Additionally, 710 shows the connections available for the site dataset most recently selected by the user, as well as the types of those connections. If desired by a user, a second dataset is selectable through either the metagraph 700 or the listed connections 710 to generate a query based on a traversal from product through the sites they are developed by to the third dataset.

When the response to the query has multiple child nodes connected to a single parent node (e.g., parent node API is connected to child nodes Blue Site, Red Site, Site 2, and Site A), the height of the cell in the table 720 for that parent node is increased to ensure all of the child nodes are in the same row as the parent node (for exported data in some formats (such as CSV), the parent node can be repeated for each row of a corresponding child node, such as listing API in each of the four rows of the connected sites). When multiple parent nodes are connected to a single child node (e.g., API, Data Analyzer, and Game are all connected to Blue Site), that child node is separately listed in the table 720 for each connected parent node.

The table 720 can be interacted with in the same ways as the table 620, as well as additional interactions based on the further selection of the site dataset. The table 720 can be sorted based on listed properties of product (name and status), as well as the name property of site, which will affect the ordering of site(s) for each product based on the selected sorting of products (e.g., reversing the sorting of site names shown at the table 720 would not affect the product side of the table 720, but would cause the sites for API to be listed in a reverse order starting with "Site A," etc.). The table 720 allows filtering of both the product dataset and the site dataset, similarly to the table 620. Additionally, the site dataset (as the most recently selected) can be unselected with the "X" at the top right of the table 720, to allow generation of a different query while retaining selection of the product dataset. Both the product and site datasets have a plus sign in a circle (⊕), allowing for additional properties to be shown for those datasets in the table 720. For nodes lacking a given property, a null result (e.g., "N/A," "-," leaving the field blank, etc.) indicating lack of the property is displayed. A null result can be shown when a node exists but does not have a requested property, or when there is no child node.

Figure 8:
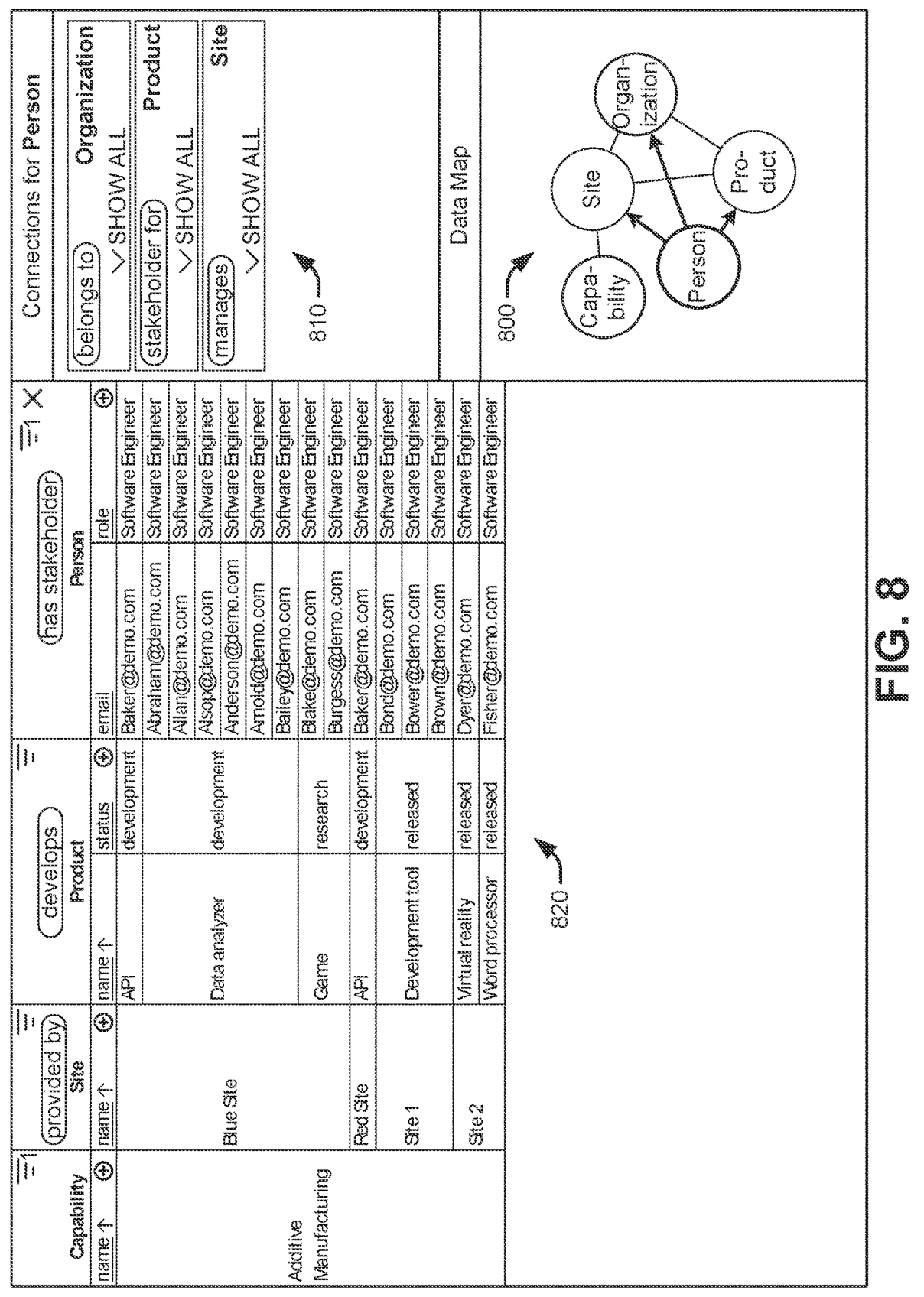

Referring to FIG. 8, illustrated is the example GUI of the graph database interface system of FIGS. 5-7 with a traversal selected from the capability dataset, through the site dataset, through the product dataset to the person dataset. Additionally, the capability dataset was filtered to show only Additive Manufacturing, and the person dataset was filtered to show only Software Engineers. Based on these selections, a query was generated and the graph database was queried for the Additive Manufacturing capability, the site(s) providing that capability, the products those sites develop, and the Software Engineer stakeholders each of those products has. The result of this query is shown as a table at 820.

The metagraph 800 has the same datasets and relationship types as the metagraphs 500, 600, and 700, but the person dataset and connections associated with the person dataset are emphasized to reflect the most recent user selection of the person dataset. Additionally, 810 shows the connections available for the person dataset most recently selected by the user, as well as the relationship types of those connections. If desired by a user, a second dataset is selectable through either the metagraph 800 or the listed connections 810 to generate a query based on continuing the traversal from persons who have the role Software Engineer to the fifth dataset.

The table 820 can be interacted with in the same ways as the tables 620 and 720. The table 820 also shows the selected filtering of both the capability dataset and the person dataset, indicated by the number "1" adjacent to the filtering icon, showing the number of filters applied to that dataset.

FIG. 9 illustrates the example GUI of the graph database interface system of FIGS. 5-8 with a non-simple traversal from persons through products those persons are stakeholders for, to persons those products have as stakeholders. While the GUI and graph database interface system are the same, the example graph database of FIGS. 9-10 differs from that of FIGS. 5-8 because there is a self-referential relationship type from the person dataset to the person dataset, as shown in the metagraph 900 and the connections for the person dataset listed at 910 (which lists both directions of that self-referential relationship type, from persons to persons managed by those persons, and from persons to persons who manage those persons).

In the example of FIG. 9, the person dataset was selected, followed by the product dataset across the relationships between the person dataset and the product dataset in a first direction (from person to product), followed by the person dataset again, across the relationships between the person dataset and the product dataset in a second direction (from product to person). Based on this selection, a query was generated and the graph database was queried for all persons, the product(s) those persons are stakeholders for, and the person(s) those product(s) have as stakeholders. A portion of the result of this query is shown as a table at 920. The metagraph 900 and the list 910 can be interacted with similarly to interactions discussed in connection with FIGS. 5-8 to generate queries involving traversals through additional datasets. Additionally, the table 920 can be interacted with similarly to the interactions discussed in connection with FIGS. 6-8.

FIG. 10 illustrates the example GUI of the graph database interface system of FIGS. 5-9 with a self-referential traversal from persons to persons they manage. In the example of FIG. 10, the person dataset was selected, followed by the person dataset again across self-referential relationships of the person dataset in the "manages" direction (as opposed to the "managed by" direction). A user can provide user input to select this traversal through the tlist 910 and/or the metagraph 900 (e.g., wherein selecting the person dataset again via the metagraph 900 after initial selection of the person dataset offers the user a choice (e.g., via pop-up, drop-down, etc.) between the two directions of the relationship: "person manages person" or "person managed by person"). Based on this selection, a query was generated and the graph database was queried for all persons, the person(s) managed by those persons. A portion of the result of this query is shown as a table at 1020. The metagraph 1000 and the list 1010 can be interacted with similarly to interactions discussed in connection with FIGS. 5-9 to generate queries involving traversals through additional datasets. Additionally, the table 1020 can be interacted with similarly to the interactions discussed in connection with FIGS. 6-9.

In another example, a virtual relationship between a first dataset and a second dataset is displayable as a table by hiding one or more additional datasets of a traversal from the first dataset through the one or more additional datasets to the second dataset. As one specific example in connection with FIG. 9, the "product" dataset can be hidden from the table 920 to show a query of all persons and the persons who they are stakeholders with on any product.

Referring back to FIG. 1, the graph database interface 120 generates a user interface for the computing environment 100 to graphically interact with the graph database 102 to generate tabular results to queries of the graph database 102, curtailing user-generated code (e.g., structured database queries). Queries of the graph database 102 through the graph database interface 120 are generated based on significantly fewer and less complex user inputs than conventional systems. Thus, the graph database interface 120 improves operational performance of the graph database interface by increasing the efficiency and speed of interactions with the graph database 102, allowing more efficient interactions even from sophisticated users, while allowing users unfamiliar with graph database-specific coding languages to generate queries of the graph database 102.

Figure 11:
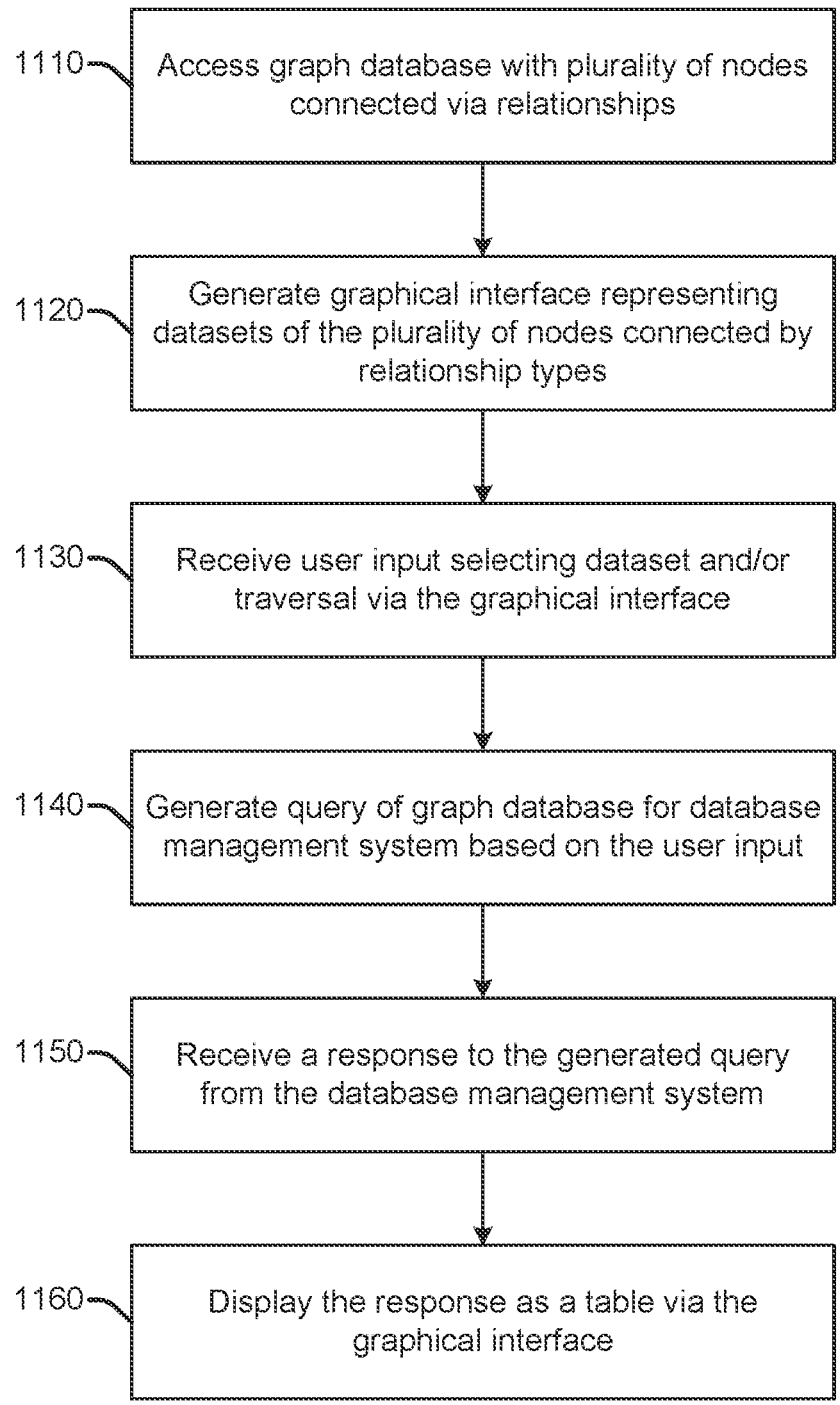
FIG. 11 illustrates a flowchart of an example method for using a graph database interface system to generate graph database queries.
Figure 12:
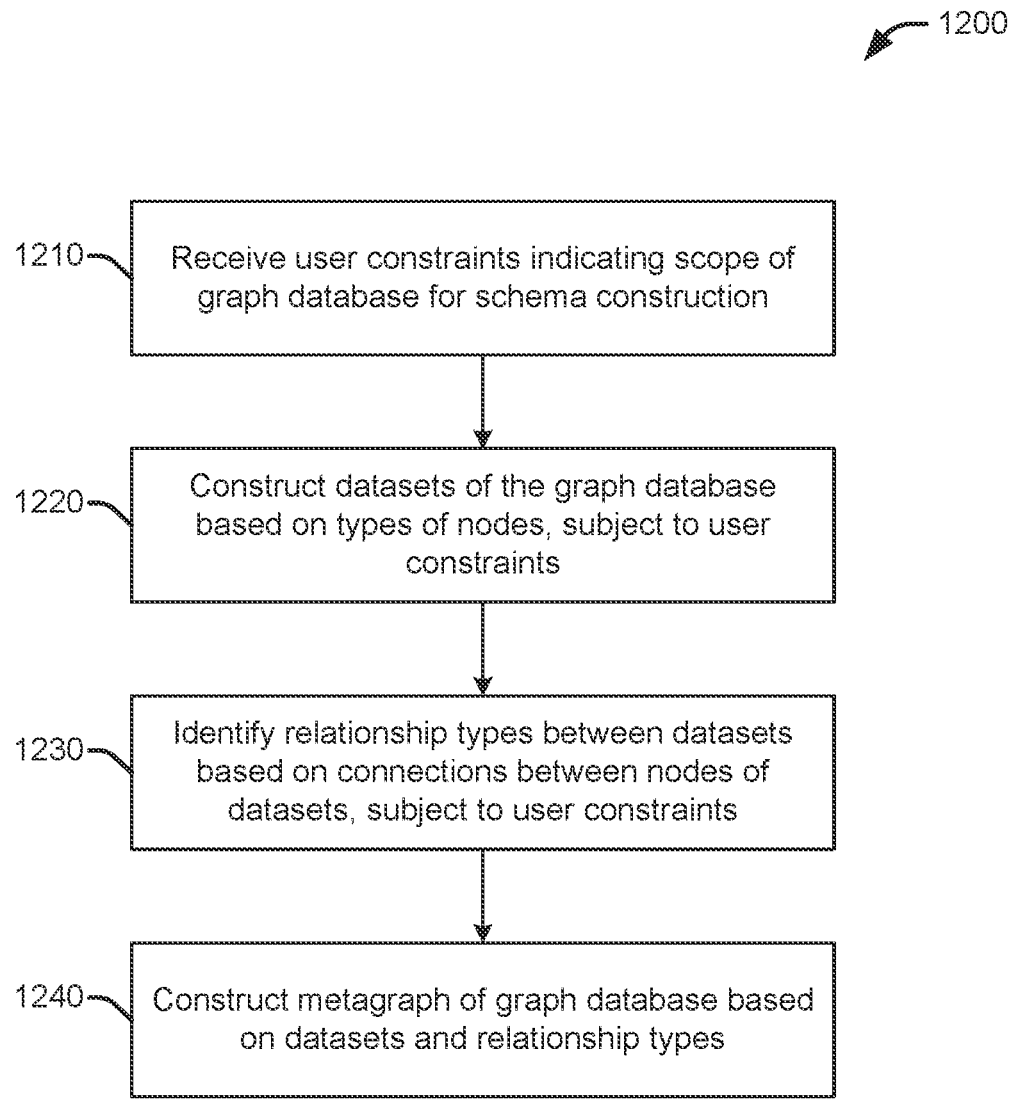
FIG. 12 illustrates a flowchart of an example method for using a graph database interface system to construct a schema of a graph database.

In view of the foregoing structural and functional features described above, an example method will be better appreciated with reference to FIGS. 11 and 12. While, for purposes of simplicity of explanation, the example method of FIGS. 11 and 12 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 11 illustrates a flowchart of an example method 1100 for using a graph database interface system (e.g., graph database interface system 120 of FIG. 1) to generate graph database queries. In other examples, the blocks of example method 1100 are a set of machine-readable instructions on a non-transitory machine-readable medium or are a set of operations performed by a processor executing machine-readable instructions as the operations.

At block 1110, the example method 1100 includes accessing a graph database that includes a plurality of nodes connected via a set of relationships. Each of the nodes is an element of a dataset of a set of datasets (e.g., persons, pies, fruits, etc.), and the relationships each have a relationship type that depends on the datasets the two nodes of that relationship are in, which in many cases is a directed relationship type (e.g., persons bring pies vs. pies are brought by persons, pies contain fruit vs. fruit is in pies, etc.). An undirected relationship can be considered as a type of directed relationship where the two directions happen to be the same (e.g., Cody is a sibling of Patricia and Patricia is a sibling of Cody, etc.). In some examples, the datasets, relationship types, and types of properties of nodes are discovered via a schema discovery method such as discussed in connection with FIG. 12, below.

At block 1120, the example method 1100 includes generating a graphical interface that visually represents the set of datasets along with the set of relationship types. In some examples, the visual representation includes a metagraph that graphically shows connections between datasets. In the same or other examples, the visual representation includes a list of datasets such as a list of cards showing properties and connections of the datasets and/or a list of datasets connected to a dataset most recently selected.

At block 1130, the example method 1100 includes receiving a user input via the graphical interface indicating a dataset or a traversal of dataset(s). The user input is user selections via the graphical interface of 1120, such as selecting one or more datasets or subsets thereof (e.g., via filtering) similarly to the examples of FIGS. 5-10.

At block 1140, the example method 1100 includes generating a query of the graph database for the DBMS based on the user input. The query is a structured database query in a code or query language appropriate for the graph database based on the DBMS.

At block 1150, the example method 1100 includes receiving a response to the query from the DBMS. Based on the query, the response includes hierarchical data in some format (e.g., JSON, etc.).

At block 1160, the example method 1100 includes displaying the response as a table via the graphical interface. The table is generated based on the hierarchical data received in response to the query, similarly to the example tables of FIGS. 6-10 (e.g., expanding cells of parent nodes to a size appropriate for the number of connected child nodes, listing child nodes multiple times when connected to multiple parent nodes, etc.).

FIG. 12 illustrates a flowchart of an example method 1200 for using a graph database interface system (e.g., the graph database interface 120 of FIG. 1) to construct a schema of a graph database. In other examples, the blocks of example method 1200 are a set of machine-readable instructions on a non-transitory machine-readable medium or are a set of operations performed by a processor executing machine-readable instructions as the operations.

At block 1210, the example method 1200 includes receiving user constraints. In some examples, the user constraints specify one or more of: nodes for which a schema is to be constructed, relationships for which a schema is to be constructed, properties of nodes for which a schema is to be constructed, or semantic labels for different directions of traversal of relationships (e.g., in connection with FIG. 2, one example set of user constraints specifies the label "brings" for traversal from persons to pies and the label "is brought by" for traversal from pies to persons). User constraints define a subset of the graph database for which the schema is to be constructed. In other examples, no user constraints are defined. In the absence of user constraints, schema construction is performed on the entire graph database.

At block 1220, the example method 1200 includes constructing a set of datasets of the graph database (either the entire graph database or subject to user constraints). Nodes of graph databases have a type or label, and nodes with a common type or label are grouped in the same dataset. A dataset is constructed for each distinct type or label among the nodes of the graph database.

At block 1230, the example method 1200 includes identifying relationship types between the set of datasets (either based on all relationships in the graph database or subject to user constraints). As long as at least one node of a first dataset has a connection to at least one node of a second dataset (e.g., a connection that is identifiable subject to user constraints), a relationship type for that connection is identified between the first and second datasets.

At block 1240, the example method 1200 includes constructing a metagraph of the graph database from nodes representing datasets connected to each other when there is a relationship type between those datasets.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Also as used herein, the term "set" means one or more elements (e.g., where the elements can be anything, such as datasets, nodes, relationships, etc.), a "subset" of a set A refers to any set B where every element of set B is an element of set A (note that for every set A, set A is a subset of set A, as every element of set A is an element of set A), and a "proper subset" of a set A refers to a subset B of set A that is not set A. Additionally, where the disclosure or claims recite "a," "an," "a first," or "another" element, or the equivalent thereof, it should be interpreted to include one or more than one such element, neither requiring nor excluding two or more such elements.

In this description, unless otherwise stated, "about," "approximately" or "substantially" preceding a parameter means being within +/−10 percent of that parameter. Modifications are possible in the described embodiments, and other embodiments are possible, within the scope of the claims.

What is claimed is:

1. A non-transitory machine-readable medium having machine executable instructions for a graph database interface that cause a processor core to execute operations, the operations comprising:
   accessing a graph database comprising a plurality of nodes connected via a set of relationships, wherein nodes of the plurality of nodes are elements of a dataset of a set of datasets, relationships of the set of relationships have a relationship type of a set of relationship types, the relationships between nodes of a given dataset and an additional dataset have a given relationship type of the set of relationship types, and the given relationship type is associated with the given dataset and the additional dataset;
   generating a graphical interface that visually displays the set of datasets along with the set of relationship types;
   receiving a user input via the graphical interface indicating a graphical manipulation of a visual feature representing a first dataset of the set of datasets to generate a query of the graph database;
   generating the query of the graph database based on the user input;
   receiving a response to the query; and
   displaying the response as a table via the graphical interface.

2. The non-transitory machine-readable medium of claim 1, wherein the user input further indicates a first subset of the first dataset and a second subset of a second dataset, and the query generated based on the user input comprises a traversal from a first subset of the first dataset to a second subset of a second dataset, across relationships between nodes of the first subset to nodes of the second subset.

3. The non-transitory machine-readable medium of claim 2, wherein the user input further indicates a third subset of a third dataset, and the query generated based on the user input further comprises a traversal from the first subset to a third subset of a third dataset, across relationships between nodes of the first subset to nodes of the third subset, and the second subset is distinct from the third subset.

4. The non-transitory machine-readable medium of claim 3, wherein a property of the second subset is aggregated and displayed in the table as a property of the first subset.

5. The non-transitory machine-readable medium of claim 2, wherein a first element of the first subset is connected to a second element of the second subset and to a third element of the second subset, the table lists the first element in the same row with the second element and with the third element, and the table lists the second element in the same column as the third element.

6. The non-transitory machine-readable medium of claim 2, wherein a first element of the first subset is connected to a second element of the second subset and a third element of the first subset is connected to a second element of the second subset, the table lists the first element in the same row with the second element, and the table lists the third element in the same row with the second element.

7. The non-transitory machine-readable medium of claim 2, wherein the first dataset is the second dataset.

8. A graph database interface system comprising:
   a memory for storing machine-readable instructions; and
   a processor core for accessing the machine-readable instructions and executing the machine-readable instructions as operations, the operations comprising:
      accessing a graph database comprising a plurality of nodes connected via a set of relationships, wherein nodes of the plurality of nodes are elements of a dataset of a set of datasets, relationships of the set of relationships have a relationship type of a set of relationship types, the relationships between nodes of a given dataset and an additional dataset have a given relationship type of the set of relationship types, and the given relationship type is associated with the given dataset and the additional dataset;
      generating a graphical interface that visually displays the set of datasets along with the set of relationship types;
      receiving a set of user selections via the graphical interface indicating a graphical manipulation of a visual feature representing a first dataset of the set of datasets to generate a query of the graph database;
      generating the query of the graph database based on the set of user selections;
      receiving a response to the query; and
      displaying the response as a table via the graphical interface.

9. The graph database interface system of claim 8, wherein the user selections further indicates a first subset of the first dataset and a second subset of a second dataset, and the query generated based on the set of user selections comprises a traversal from a first subset of the first dataset to a second subset of a second dataset, across relationships between nodes of the first subset to nodes of the second subset.

10. The graph database interface system of claim 9, wherein the user selections further indicates a third subset of a third dataset, and the query generated based on the set of user selections further comprises a traversal from the first subset to a third subset of a third dataset, across relationships between nodes of the first subset to nodes of the third subset, and the second subset is distinct from the third subset.

11. The graph database interface system of claim 8, wherein the operations further comprise analyzing the graph database to identify the set of datasets and the set of relationship types.

12. The graph database interface system of claim 11, wherein the operations further comprise receiving a set of user constraints and analyzing the graph database is performed subject to the set of user constraints.

13. The graph database interface system of claim 12, wherein the set of user constraints specify: the plurality of nodes, the set of relationships, and a set of properties of nodes of the plurality of nodes.

14. A method for interacting with a graph database, the method comprising:
   accessing a graph database comprising a plurality of nodes connected via a set of relationships, wherein nodes of the plurality of nodes are elements of a dataset of a set of datasets, relationships of the set of relationships have a relationship type of a set of relationship types, the relationships between nodes of a given dataset and an additional dataset have a given relationship type of the set of relationship types, and the given relationship type is associated with the given dataset and the additional dataset;

generating a graphical interface that visually displays the set of datasets along with the set of relationship types;

receiving a user input via the graphical interface indicating a graphical manipulation of a visual feature representing a first dataset of the set of datasets to generate a query of the graph database;

generating a query of the graph database based on the user input;

receiving a response to the query; and displaying the response as a table via the graphical interface.

15. The method of claim 14, wherein the user input further indicates a first subset of the first dataset and a second subset of a second dataset, and the query generated based on the user input comprises a traversal from a first subset of the first dataset to a second subset of a second dataset, across relationships between nodes of the first subset to nodes of the second subset.

16. The method of claim 15, wherein the user input further indicates a third subset of a third dataset, and the query generated based on the user input further comprises a traversal from the first subset to a third subset of a third dataset, across relationships between nodes of the first subset to nodes of the third subset, and the second subset is distinct from the third subset.

17. The method of claim 14, wherein the graphical interface comprises a visual representation of a metagraph of the graph database that characterizes the set of datasets connected to each other via the set of relationship types.

18. The method of claim 17, wherein the user input is received at least in part via the visual representation of the metagraph.

19. The method of claim 14, wherein the graphical interface comprises a list of the set of datasets along with relationship types between the set of datasets.

20. The method of claim 19, wherein the user input is received at least in part via the list.

* * * * *